United States Patent [19]

Ogasawara

[11] Patent Number: 5,037,307

[45] Date of Patent: Aug. 6, 1991

[54] CONNECTING STRUCTURE FOR CONNECTING MOTOR FOR DRIVING MIRROR MAIN BODY OF AUTOMOBILES OUTSIDE MIRROR ASSEMBLY AND POWER SOURCE

[75] Inventor: Morihiko Ogasawara, Aichi, Japan

[73] Assignee: Kabushiki Kaisha Tokai Rika Denki Seisakusho, Aichi, Japan

[21] Appl. No.: 550,524

[22] Filed: Jul. 10, 1990

[30] Foreign Application Priority Data

Jul. 11, 1989 [JP] Japan ............................... 1-81452[U]

[51] Int. Cl.⁵ ............................................ H01R 33/00
[52] U.S. Cl. ...................................... 439/34; 439/272
[58] Field of Search ...................... 439/34, 272, 281; 350/606, 634, 637

[56] References Cited

U.S. PATENT DOCUMENTS

| | | | |
|---|---|---|---|
| 4,701,037 | 10/1987 | Bramer | 350/637 X |
| 4,930,370 | 6/1990 | Yoshida | 350/634 X |
| 4,940,420 | 7/1990 | Munie | 439/272 |
| 4,973,147 | 11/1990 | Fujita et al. | 439/34 X |

*Primary Examiner*—Eugene F. Desmond

[57] ABSTRACT

A connecting structure for connecting a motor for driving the mirror main body of an automobile outside mirror assembly such as an electric door mirror and a fender mirror and the power source of the motor to each other. A driving unit accommodating the motor is provided on the rear side of the mirror main body in the mirror visor. A power cord extends from a battery installed on an automobile main body into the mirror visor. A connector containing power terminals is mounted on the top portion of the power cord. The connection terminals of the motor project outward through the through-holes from a rear wall of a unit case of the driving unit to the rear side of the driving unit. The connector has through-holes for allowing the connection terminals to pass therethrough. The connection terminals are inserted through the through-holes and connected with the power terminals in the connector. Projecting walls formed on the connector and the unit case are fitted into each other with a waterproofing member provided therebetween. The power terminals contained in the connector are held to extend in the direction perpendicular to the connection terminals of the motor.

3 Claims, 2 Drawing Sheets

CONNECTING STRUCTURE FOR CONNECTING MOTOR FOR DRIVING MIRROR MAIN BODY OF AUTOMOBILES OUTSIDE MIRROR ASSEMBLY AND POWER SOURCE

BACKGROUND OF THE INVENTION

1. Field of the Invention

The present invention relates to a connecting structure for connecting a motor for driving the mirror main body of an automobile outside mirror assembly to the power source and, more particularly, to a structure for connecting the motor to the power source thereof through a connector.

2. Description of the Related Art

Generally, a motor for driving the mirror main body of an automobile electric outside mirror assembly is accommodated in a mirror visor together with other mechanisms as a unit. A pair of positive and negative connection terminals of the motor is connected with a pair of connection cords extending from the power source mounted on the automobile main body. The known structures for electric connection of the motor and the power source thereof are described below.

An example of a simple connection structure is described below. Each end of a pair of connection cords is soldered into each connection terminal of the motor. The other end of each cord extends outwardly from a unit case through a opening thereof and connected to each cord extending from the power source through a connector provided outside the unit case.

According to another known construction, similarly to the above structure, each end of a pair of connection cords is soldered into each connection terminal of the motor. In addition, another pair of terminals is fixed to the outside of the unit case. The other end of each cord connected with the motor is soldered onto each terminal fixed to the outside of the unit case. Each connection terminal of a connector connected to the power source contacts each terminal fixed to the outside of the unit case.

According to these known connection structures, the use of the connection cords leads to a high manufacturing cost and necessitates a soldering operation, which is troublesome.

The following connection structures are proposed to solve these problems.

A pair of connection terminals of the motor projects outwardly from the motor case and the top portion of each connection terminal projects outwardly from the unit case through an opening formed on the rear wall of the unit case so that the top portions of each connection terminal is positioned beyond the rear wall of the unit case. The top portion of each connection terminal is directly covered with a waterproofing member. A pair of connecting openings are formed in the waterproofing member. A pair of connection terminals of a connector connected with the power source is inserted through the openings so that each terminal of the motor and each terminal of the connector are connected to each other in a sort of linear structure.

However, the waterproofing performance of this structure is not preferable because the connecting openings are formed on the waterproofing member which directly covers the connection terminals of the motor. In addition, since the top portions of the connection terminals of the motor are covered with the waterproofing member, i.e., since the top portions cannot be seen, it is necessary to detect the polarity of the connection terminals of the motor so as to appropriately connect each of the connection terminals of the motor and each of the connection terminals of the connector to each other. Furthermore, since the connection terminals of the connector and motor are connected in their axial direction to present a linear structure of terminals, and since such a linear structure of terminals extends in a direction substantially perpendicular to the surface of the mirror, the mirror visor eventually results in a bulky size, particularly measured in a direction perpendicular to the surface of the mirror. Thus, it has been difficult to reduce the size of the mirror visor with the use of the prior art terminal connecting structure.

SUMMARY OF THE INVENTION

The present invention has been developed effectively to solve the above described problems.

That is, the present invention provides a structure for connecting the power source and the driving motor of the mirror main body in an automobile outside mirror assembly to each other, namely, the structure for connecting a connector connected to the power source and a driving unit to each other without using a connection cord between them.

It is therefore an object of the present invention to provide a terminal connecting structure, for connecting the driving motor and the power source to each other, which can be visually detected the polarity of connection terminals of the connectors in fixing the connector to the driving unit, is superior in waterproofing performance, and contributes to the formation of a small mirror visor.

According to the present invention, there is provided the following connecting structure for connecting the motor included in the driving unit for driving the mirror main body of an automobile outside mirror assembly and the power source of the motor to each other.

The connecting structure has a unit case for accommodating the driving unit. The unit is positioned on the rear side of the mirror main body. The motor has a pair of connection terminals extending therefrom. The unit case has first through-holes permitting the connection terminals to pass therethrough so as to project outwardly from the unit case. The driving unit is fixed to a connector accommodating generally elongated power terminals which are connected with the power source and in contact with the connection terminals of the motor. The unit case has a first projecting wall which projects rearwardly from the rear wall of the unit case so as to surround the first throughholes formed in the rear wall. The case of the connector has second through-holes for permitting the connection terminals to pass therethrough. The power terminals are extended in a direction perpendicular to the connection terminals. The connector case has a second projecting wall which surrounds the second through-holes to fit into/over the first projecting wall. A sealing member is provided between the first and second projecting walls for sealing a space which is defined between the first and second projecting walls.

According to the present invention, in fixing the connector to the driving unit, each of the connection terminals, of the driving motor, projecting outwardly from the unit case is inserted through each of the second throughholes formed in the connector. Thus, each of the connection terminals is connected with each of the power terminals accommodated in the connector. In fixing the connector to the driving unit, the second projecting wall is fitted into the first projecting wall or the first projecting wall is fitted into the second projecting wall and a water-proofing is accomplished between the surfaces of the first and second projecting walls, i.e., the water-proofing member performs its function without contacting the connection terminals. Thus, this structure waterproofs the terminal connection structure more favorably than the structure in which connection terminals are directly covered with a water-proofing member.

Further, since the connection terminals of the motor project from the unit case, the polarity of the connection terminals can be visually detected before the connector is attached to the driving unit.

Generally, in this kind of terminal connecting structure, a driving unit is provided on the rear side of the mirror main body, and a connector is fixed to the driving unit on the rear side thereof. Therefore, the mirror assembly makes a mirror visor bulky. However, according to the present invention, since the terminals of the power source extend inside the connector in the direction perpendicular to the connection terminals of the motor, the size of the connector is small in a direction perpendicular to the surface of the mirror, which prevents the mirror visor from being bulky.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
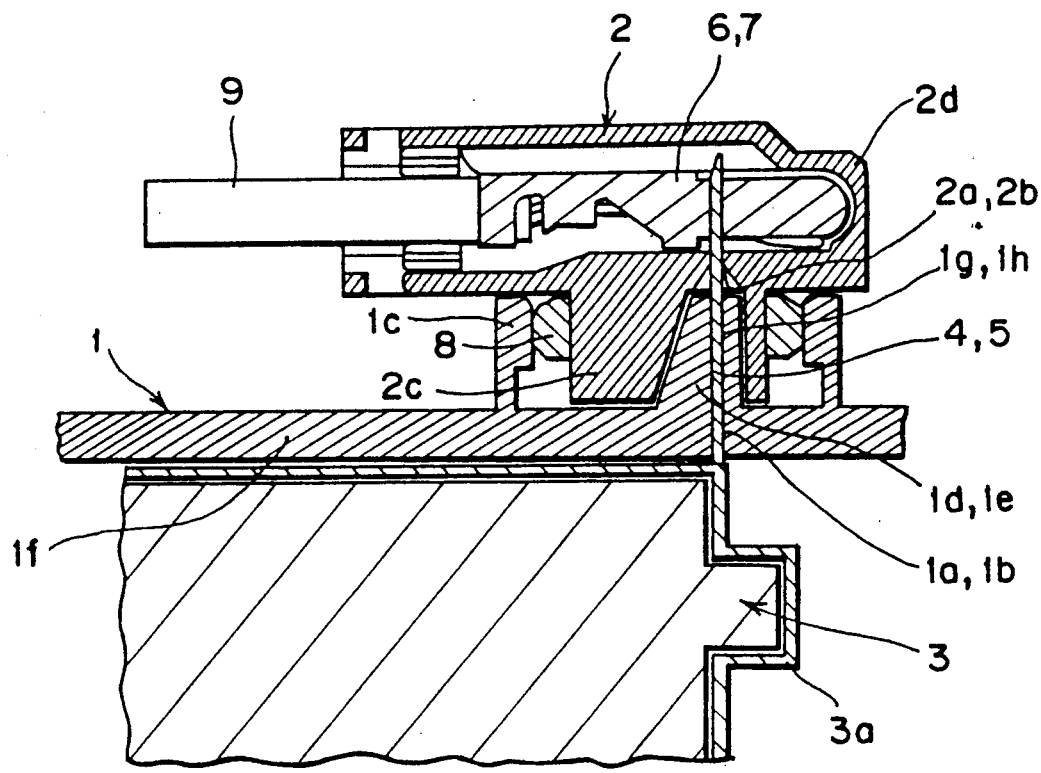
FIG. 1 is a vertical sectional view showing a connecting structure for connecting a motor for driving the mirror main body of an automobile outside mirror assembly and the power source of the motor to each other according to one embodiment of the present invention.
Figure 3:
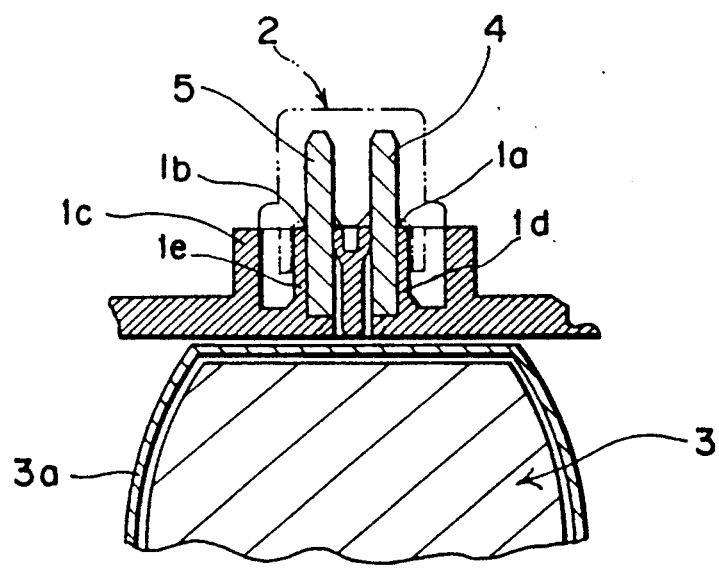
FIG. 3 is a sectional view taken along the line III—III shown in FIG. 2.

In this embodiment, a motor for driving a mirror main body (not shown) is denoted by reference numeral 3, and a motor case 3a as well as a part of the motor 3 are shown in FIGS. 1 and 3. The motor 3 has a pair of connection terminals 4 and 5 approximately rectangular and projecting outward from one end surface of the case 3a. A connector 2 which is long and accommodates a pair of power terminals 6 and 7 is attached to one end portion of a cord 9 extending from the power source (not shown). When the connector 2 is fixed to the motor 3, the power terminals 6 and 7 and the connection terminals 4 and 5 of the motor 3 are connected to each other. In FIG. 3, the connector 2 is shown by a two-dot chain line.

An automobile outside mirror assembly to which the power source connecting structure is applicable is a electric door mirror. The mirror main body (not shown) is tiltably supported in a mirror visor (not shown). A driving unit for a mirror main body is accommodated in a unit case 1. The unit case 1 is positioned on the rear side of the mirror main body accommodated in the mirror visor. The unit case 1 accommodates the motor 3 fixed to the rear wall 1f thereof. The pair of the connection terminals 4 and 5 of the motor 3 project from the motor case 3a, thus penetrating through the rear wall 1 of the unit case 1, thus contacting the power terminals 6 and 7.

Figure 2:
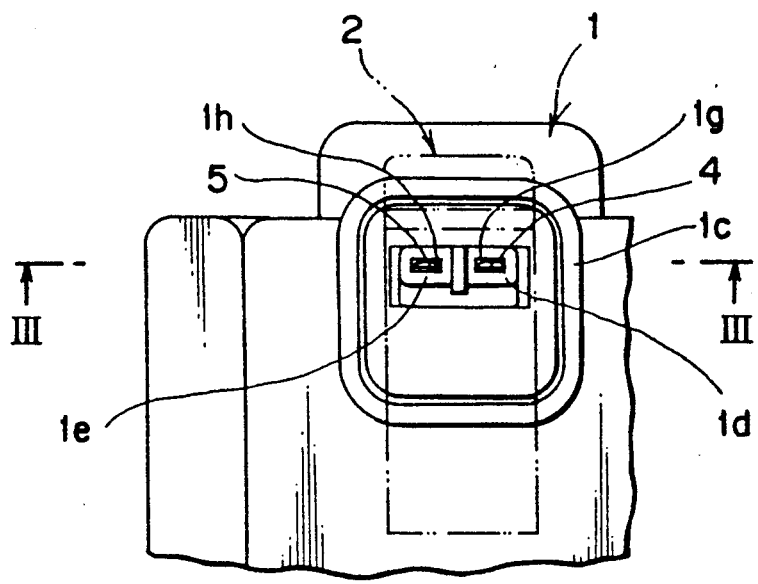
FIG. 2 is a plan view of, FIG. 1, excepting a connector case.

There are provided, through the rear wall 1f of the unit case 1, through-holes 1a and 1b for projecting the top portion of each of the connection terminals 4 and 5 of the motor 3 outwardly from the unit case 1. Needless to say, the top portions of the connection terminals 4 and 5 are positioned beyond the rear wall of the unit case 1. Holding portions 1d and 1e projecting from the rear wall 1f of the unit case 1 hold each base portion of the connection terminals 4 and 5. The through-holes 1g and 1h communicating with the through-holes 1a and 1b, respectively are formed through the holding portions 1d and 1e. The holding portions 1d and 1e are approximately trapezoidal in the longitudinal sectional view thereof. As shown in FIG. 2, a first projecting wall 1c approximately rectangular projects from the rear wall 1f, thus surrounding the holding portions 1d and 1e.

There are provided, in the case 2d of the connector 2, through-holes 2a and 2b for inserting the top portions of each of the connection terminals 4 and 5 of the motor 3 into the case 2d. A second projecting wall 2c extends from the connector case 2d, thus surrounding the through-holes 2a and 2b. The holding portions 1d and 1e of the unit case 1 are fitted into the second projecting wall 2c which is fitted into the first projecting wall 1c. The connector case 2d is illustrated in FIG. 2 with a two-dot chain line.

A waterproofing member, or a sealing member 8 is provided between the peripheral surface of the second projecting wall 2c and the inner peripheral surface of the first projecting wall 1c.

The insertion of the second projecting wall 2c into the first projecting wall 1c allows the connection terminals 4 and 5 of the motor 3 and the connection terminals 6 and 7 of the connector 2 to be connected to each other. Further, the sealing member 8 seals the space which is defined between the second projecting wall 2c and the first projecting wall 1c. Therefore, this structure enables a more favorable waterproofing technique as compared to known structures.

The power terminals 6 and 7 of the connector 2 accommodated in the connector case 2d extend in the direction approximately perpendicular to the connection terminals 4 and 5, of the motor 3, to be inserted through the through-holes 2a and 2b, respectively. This structure eventually results in a reduction of the size of an assembly of the connector 2 and the driving unit, in a direction perpendicular to the surface of the mirror. That is, the connector case 2d projects a short distance from the rear wall 1f of the unit case 1, thus resulting in a reduction of the size of the mirror visor.

According to the terminal connecting structure of the embodiment, it is unnecessary to employ a connection cord required to be soldered. That is, the connection terminals 4 and 5 of the motor 3 can be brought into contact with the power terminals 6 and 7 by fitting the second projecting wall 2c of the connector case 2d into the first projecting wall 1c of the unit case 1 such that the connection terminals 4 and 5 of the motor 3 pass through the through-holes 2a and 2b of the connector case 2d. Thus, the motor 3 is connected to the power source.

In the above-described embodiment, the second projecting wall 2c is fitted into the first projecting wall 1c, but instead, the terminal connecting structure may be modified by fitting the first projecting wall 1c into the second projecting wall 2c.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a connecting structure for connecting a motor included in a driving unit for driving a mirror main body of an automobile outside mirror assembly and a power source of said motor having:

a unit case for accommodating said driving unit, positioned on a rear side of said mirror main body; and having first through-holes for permitting connection terminals extending from said motor to pass therethrough so as to project outwardly from said unit case; and a connector fixed to said driving unit, accommodating generally elongated power terminals which are connected with said power source and in contact with said connection terminals of said motor, the improvement comprising:

a first projecting wall projecting rearwardly from a rear wall of said unit case so as to surround said first through-holes formed in said rear wall;

a connector case having second through-holes for permitting the connection terminals to pass therethrough, and for accommodating said power terminals which extend in a direction perpendicular to said connection terminals;

a second projecting wall formed on said connector case to surround said second through-holes to fit into/over said first projecting wall; and a sealing member provided between said first and second projecting walls for sealing a space which is defined between said first and second projecting walls.

2. A connection structure as claimed in claim 1, further comprising:

holding portions surrounding base portions of said connection terminals so as to hold the base portions of the connection terminals and fitted into said second projecting wall which is fitted into said first projecting wall.

3. A connection structure as claimed in claim 2, wherein said each holding portion is approximately trapezoidal in its vertical section.

* * * * *